June 12, 1945.  V. VOORHEES ET AL  2,378,342

CATALYTIC CONVERSION PROCESS AND APPARATUS

Filed Dec. 31, 1941

Inventors:
Vanderveer Voorhees
William L. Webb
By Pike H. Sullivan
Attorney

Patented June 12, 1945

2,378,342

UNITED STATES PATENT OFFICE 2,378,342

CATALYTIC CONVERSION PROCESS AND APPARATUS

Vanderveer Voorhees, Homewood, and William L. Webb, Chicago, Ill., assignors to Standard Oil Company, Chicago, Ill., a corporation of Indiana Application December 31, 1941, Serial No. 425,134

15 Claims. (Cl. 196—52)

This invention relates to a process and apparatus for catalytic conversion of hydrocarbon oils and for carrying out catalytic reactions in general wherein a suspended solid catalyst is employed in contact with reacting vapors or gases. More particularly, the invention relates to cracking of heavy hydrocarbon oils by contacting their vapors at conversion temperatures with suspended solid conversion catalysts. Still more particularly the invention relates to an improvement in the simultaneous conversion of oils and regeneration of suspended catalyst within a unitary chamber or converter.

One object of the invention is to convert heavy hydrocarbon oils into gasoline of high knock rating by contacting the oils and the vapors thereof with suspended, subdivided catalysts at a higher ratio of catalyst to oil than has heretofore been feasible. Another object of the invention is to supply the heat for cracking and also vaporizing the oil, if desired, by the circulation of a high ratio of catalyst from the exothermic regeneration zone to the conversion zone. A further object of the invention is to simplify the apparatus employed in the suspended catalyst conversion process by substantially reducing the number of valves, conduits and heat exchange equipment, and eliminating entirely the need of handling erosive catalyst between reactor and regenerator. A still further object of the invention is to obtain more uniform temperature control within the catalyst regeneration zone and reduce the formation of carbon dioxide therein in favor of the formation of carbon monoxide which is mixed with the fixed gases from the hydrocarbon conversion to produce a valuable fuel gas as a product of the process. Other objects of the invention will be apparent from the following description thereof.

Figure 1:
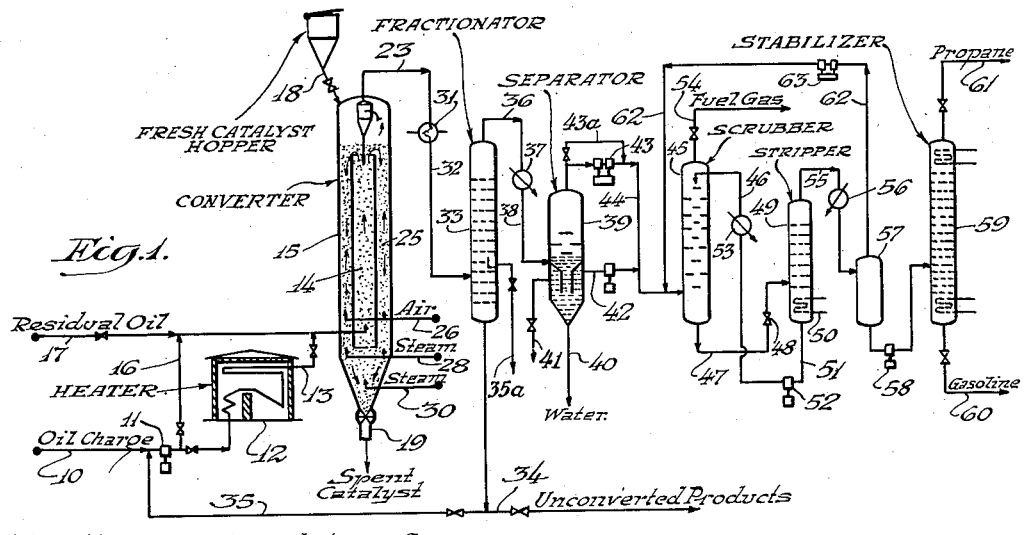
Figures 2, 3:
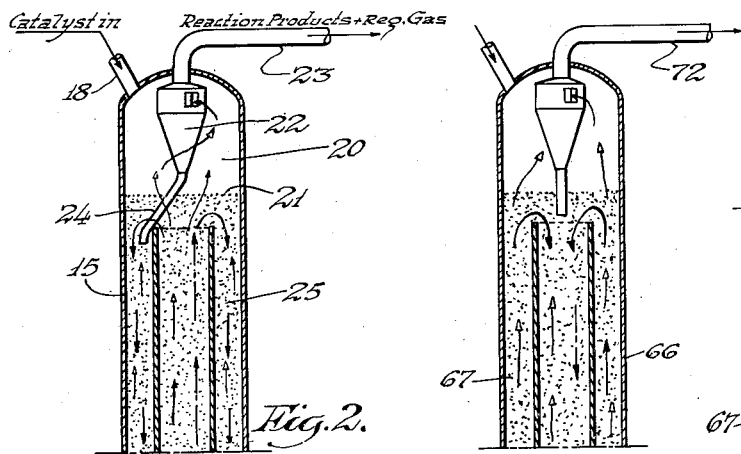

The invention is illustrated by a drawing which shows in Figure 1 a diagram in elevation of a plant for the conversion of hydrocarbon oils into gasoline and fuel gas. Figure 2 of the drawing is a more detailed vertical section of the combination reactor and regenerator or converter of Figure 1.

Figure 4:
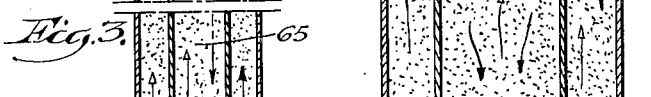

Figure 3 of the drawing is an alternative arrangement of the converter. Figure 4 is a modification applicable to the converter shown in Figure 3 for separately withdrawing from the regeneration zone a portion of the monoxide-containing combustion gases.

Referring to the drawing, Figure 1, charging stock which may be a typical gas oil cracking stock, for example 35° A. P. I. Mid-Continent gas oil, is charged by line 10 and pump 11 to heater 12 and thence by transfer line 13 to reaction zone 14 of the converter 15. The gas oil charged may be completely vaporized in furnace 12 if desired or it may be only preheated therein. It may also be preheated by heat exchange with reaction products, if desired, in heat exchangers which may supplement or substitute for heater 12. Any desired amount of the gas oil charging stock may be by-passed around the heater 12 by by-pass line 16. A second charging stock, for example a residual oil such as a 20% to 40% Mid-Continent residuum, may be introduced into the converter by line 17 and may be substituted in part or wholly for the vaporizable charging stock introduced by line 10. Heat exchange between the residual oil charged and the reaction products may be employed to increase the temperature of the heavy unvaporizable feed stock and a charging stock temperature of 400 to 700° F., for example, may be obtained by this means.

Referring to Figure 2 which shows the converter 15 in greater detail, it is preferred to direct the charging stock vapors upwardly in reaction zone 14, and where the charging stock is an unvaporized oil, it is desirable to employ a distributor or spray nozzle to obtain rapid distribution within the reaction zone. In zone 14 hydrocarbons immediately contact the catalyst which is suspended therein and which substantially fills the reaction zone. The density of the catalyst suspension may vary over a considerable range depending on conditions, character of charging stock, etc., and in general the density will fall within the range of about ½ pound to 30 pounds per cubic foot, a density of 5 pounds to 15 pounds per cubic foot being typical. The catalyst employed in the process is a granular or powdered refractory solid, preferably having a particle size sufficiently fine to remain easily suspended in the turbulent vapors but not so fine as to make recovery and separation from the vapors difficult. A catalyst size of about 10 mesh to 300 mesh is satisfactory, although somewhat coarser or somewhat finer catalysts may also be employed.

Cracking catalysts for the conversion of heavy oils into gasoline are suitably combinations of active silica and alumina, silica and magnesia or mixtures of these with each other or with small amounts of other metal oxides such as zirconium oxide, thorium oxide, beryllium oxide, and fluorides, such as aluminum fluoride or magnesium fluoride or the fluosilicates of aluminum or magnesium. Silica gel mixed with active alumina or magnesia in amounts of about 2 to 30% of the latter is very effective. We may also use activated natural earths such as fuller's earth, montmorillonite clay, bentonite, etc., and acid activated montmorillonite clay, known as Super Filtrol, is satisfactory. In general, our process is adapted to employ catalysts of relatively low activity and low heat stability which are distinguished by their ability to give a desirable product distribution and high gasoline knock rating. The catalyst is supplied to the converter by line 18 and withdrawn by rotary valved outlet 19 when it is desired to add fresh catalyst to the system or remove used catalyst from the system to maintain a selected level of performance.

Oil vapors and catalyst flow upwardly through reaction zone 14 into separation zone 20 at the top of the converter. The bulk of the catalyst separates from the vapors in zone 20 and may form a definite interface as indicated at 21. Zone 20 may be enlarged in cross sectional area, if desired, to reduce the vapor velocity therein and facilitate catalyst separation. Any catalyst remaining in the vapors at the top of zone 20 is substantially all removed from the vapors in cyclone separator 22, the vapors being conducted away by line 23 and the separated catalyst being returned by dip leg 24 to a point below the dense phase catalyst level. The course of the catalyst flow is shown by the heavy broken arrows while the direction of vapor flow is shown by the small light arrows.

In the reaction zone 14 the catalyst accumulates a small amount of carbonaceous matter from the reaction which may be within the range of about 0.01% to 2 or 3%, depending on the nature of the catalyst and the character of the oil treated. The amount of carbon deposited from unvaporizable residual oils will be substantially greater than from vaporizable hydrocarbon stocks such as gas oil, kerosene, and heavy naphtha charged in a reforming operation. It is necessary to remove a substantial amount of the carbonaceous deposit from the catalyst to maintain catalyst activity. Removal of carbon in regeneration is accomplished by combustion with the oxygenous gas which may be supplied as air if desired.

Regeneration is effected in regeneration zone 25 which is shown in Figure 2 as an annular space surrounding the reaction zone 14 in the cylindrical converter 15 said zones being merged at opposite ends as shown. Air for regeneration is introduced by line 26 and distributed over the cross sectional area of the annular regeneration space. Regeneration zone 25 is designed with sufficient cross sectional area to provide a relatively lower vapor velocity for the regeneration gases than the velocity of the vapors in the reaction zone 14. As a result, catalyst flows downward through the regeneration zone countercurrently to the upflowing regeneration gases. Regeneration air may be introduced into the zone 25 at a plurality of points distributed throughout the length of the zone if desired to effect a more uniform regeneration, although this is usually not necessary.

One of the characteristic features of our process is the regeneration of the catalyst at nearly the same temperature as or only slightly higher than that employed in the reaction zone, a circumstance brought about by the high catalyst to oil ratio employed. The rapid circulation of catalyst from the regeneration zone to the reaction zone and vice versa serves to equalize the temperature throughout the converter and prevent local high temperature or low temperature zones developing. Heat generated in the regeneration zone is absorbed by the catalyst and instantly conveyed or convected to the reaction zone where heat is absorbed by the conversion reaction. The maximum temperature differential between the two zones may not exceed 100° F. and may be only 25 to 50° F. or even less.

As a result of the uniformity of temperature and the high catalyst ratio, a higher reaction temperature may be employed than has been heretofore practicable, although a lower regeneration temperature may be employed because complete regeneration of catalyst is not necessary where the catalyst-to-oil ratio is maintained at the high levels contemplated in our process. The reaction and regeneration temperatures are, therefore, selected to suit the particular catalyst and charging stock employed. Temperatures within the range of about 800 to 1100° F. may be employed and, in general, temperatures of the order of 950 to 1050° F. are satisfactory. The temperature is regulated by various means and may be held in balance by regulating the heat input of the feed stock, the temperature of the regeneration air, the extent of heat loss from the surface of the converter and the temperature of the stripping steam. The amount of regeneration air required is fixed by the amount of carbon deposited on the catalyst which must be removed, to prevent accumulation of carbon to a point where catalyst efficiency is undesirably reduced. The amount of carbon deposited in the reaction zone depends to a large extent on the character of the oil feed and the extent of conversion. Thus a conversion of 40 or 50% of gasoline per pass generally results in the deposition of 1 to 3% of carbon, while a conversion of only 20 to 30% may produce only 0.5% of carbon with the same catalyst. It is therefore desirable to maintain a controllable heat input or heat removal to and from the converter to assist in maintaining the desired temperature balance.

When operating under conditions of regeneration such as to incompletely remove the carbon from the catalyst, we produce carbon monoxide rather than carbon dioxide in the regenerator. The spent regeneration gases including carbon monoxide pass upwardly through the regeneration zone 25 as indicated by the direction of the small light arrows. In the upper part of the regeneration zone 25 the gases serve to displace and remove from the catalyst, vaporous hydrocarbon reaction products associated therewith, thereby preventing these desirable reaction products from being destroyed by oxidation in the regeneration zone. The carbon monoxide-containing regeneration gases intermingle in separating zone 20 with the vaporized reaction products from 14 and flow from the converter through cyclone 22 and line 23.

As the catalyst stream flowing downward passes the air inlet 26 it enters a stripping zone 27 where it is swept with a current of steam or other inert gas introduced by line 28, the function of the stripping being to displace and substantially remove air from the catalyst before recycling to the reaction zone 14. We contemplate operating in the absence of stripping steam by eliminating oxygen through reaction with residual carbonaceous material remaining on the catalyst leaving the regeneration zone, and sufficient time may be provided between the regeneration zone and reaction zone to permit this scavenging reaction to proceed to substantial completion. We have also found that even though a substantial proportion of the oxygen used in regeneration is transferred from the regeneration zone to the reaction zone, it will not seriously militate against the process economically.

The regenerated catalyst from the regeneration zone and stripping zone flows freely without restriction around the baffle 29 separating the regeneration and reaction zones and back to the reaction zone 14. An additional stream of steam or inert gas may be introduced by line 30 to aerate the catalyst in the bottom of the converter and maintain it in free-flowing condition. Steam introduced at 30 may also be employed to strip the catalyst when it is desired to withdraw a part of it from the system by line 19 as previously described.

It is essential to avoid as far as possible restrictions in the path of the catalyst flowing from the reactor to the regenerator and vice versa in order to maintain the high catalyst to oil ratios which are characteristic of our process. In conventional practice the ratio of catalyst to oil may be of the order of 2 to 3 parts of catalyst to one part of oil by weight, whereas in our process we prefer to employ catalyst-to-oil ratios of the order of 20 to 40 parts of catalyst per part of oil introduced into the converter and even as high as 60 to 100 parts of catalyst per part of oil. Our process may be conducted, however, with lower catalyst ratios of the order of 5 to 10, if desired. The ratio is based on the weight of catalyst circulated in the system and not on the total catalyst in the system. Thus, a circulation of 20 tons of catalyst per hour from the regenerator to the reactor with a feed rate of one ton of oil per hour corresponds to a ratio of 20.

Referring again to Figure 1, the reaction product vapors, substantially free of catalyst, are conducted by line 23 to heat exchanger 31 and thence by line 32 to fractionator 33 wherein the heavy unconverted products of the reaction are substantially separated as a reflux condensate. The unconverted products may be withdrawn from the system by line 34 or recycled by line 35. When these products are recycled they carry back to the system as a slurry any fine catalyst escaping with the products from the converter 15, thereby effectively preventing the loss of any catalyst from the system. The amount of reflux produced in fractionator 33 may only be sufficient to satisfactorily return fine catalyst to the converter. However, we prefer to operate fractionator 33 to produce end point gasoline overhead while recycling a small, heavy fraction containing carried over catalyst through line 35 and removing the major part of the gas oil by trapout through line 35a.

The reaction products pass from 33 by vapor line 36 leading to condenser 37 and thence by line 38 to separator 39 in which condensed oil and water are separated as indicated, the water being drawn off by line 40 and the oil by line 41 or returned to the vapor stream by line 42. This oil or heavy naphtha stream may be blended with the final gasoline stream either entering or leaving the stabilizer. Cooled vapors from the separator 39 pass through compressor 43 where the pressure may be increased if desired to 50 or 100 pounds per square inch and thence by line 44 to absorber or scrubber 45 where condensible products are recovered in a scrubbing oil introduced at 46. When operating absorber 45 at reaction pressure, the compressor may be by-passed by line 43a. The rich oil is withdrawn from the absorber by line 47 and flows through valve 48 into stripper 49 which may be operated at a lower pressure if desired. In the stripper the vaporous products are driven off by heat supplied by coil 50 and the absorber oil is returned by line 51 and pump 52 through cooler 53 and line 46 back to the scrubber.

Unabsorbed gases are withdrawn from absorber 45 by line 54. These gases consist of carbon monoxide, some carbon dioxide, and fixed hydrocarbon gases including ethane, methane, ethylene, and hydrogen together with nitrogen entering the system with the regeneration air. The heating value of the gases may be about 100 to 200 B. t. u. per cubic foot, more or less, depending on the conditions of conversion, the character of the feed stock, etc., and a value of 160 B. t. u., net, is typical. However, we may increase the heating value of the gases by employing oxygen, tempered with steam, in place of air used in regeneration.

The vaporous products from stripper 49 are conducted by line 55 to cooler 56 and receiver 57, whence the condensate is withdrawn by pump 58 and charged to stabilizer 59, the pressure of the stabilizer preferably being about 200 to 250 pounds per square inch. Stabilized gasoline is withdrawn by line 60 and fixed gas, principally propane, is withdrawn by line 61. The gas withdrawn at 61 may be employed, if desired, for enriching the fuel gas eliminated by line 54. The gases from the separator 57 are conducted by line 62 and blower or compressor 63 back to scrubber 45. The gasoline produced is characterized by a high knock rating, generally in the range of about 78 to 90, A. S. T. M., when cracking a typical Mid-Continent gas oil.

In the modification of the converter shown in Figure 3, regeneration zone 65 is located in the middle of the converter 66 while the reaction zone 67 occupies the annular space surrounding the regeneration zone. In this case the flow of catalyst is reversed, the catalyst passing up through the annular outer zone and down through the center zone in the direction of the heavy broken arrows. The flow of regeneration gases and catalyst is countercurrent just as in the converter shown in Figure 2. Oil is introduced by distributing line 68, air by line 69 and stripping steam by lines 70 and 71, while the products are withdrawn by line 72.

If desired, a portion of the regeneration gases containing carbon monoxide and nitrogen may be withdrawn from the regeneration zone by a hood interposed therein as illustrated in Figure 4 which corresponds to a section of the converter shown in Figure 3. Referring to Figure 4 the hood 73 is positioned looking downward in regeneration zone 65 near the upper end thereof at a point where the regeneration gases are substantially spent, i. e., free from oxygen. Descending catalyst flows downward past the hood 73 while upflowing regeneration gases in large part enter the hood 73 and are conducted away from the system by line 74. A portion of the gases are permitted to flow upward past the hood and serve to displace reaction products from the catalyst going into the regeneration zone. By this arrangement, we may extract from the system about 25 to 75% of the regeneration gases which have a low heating value, thereby increasing the heating value of the fuel gas produced by the process inasmuch as that portion of the fuel gas derived from the hydrocarbon conversion reaction has a much higher heating value than that derived from the regeneration reaction. Much the same object may be achieved in a less advantageous fashion by separately withdrawing part of the reaction products from the reaction zone, using a similar hood or vapor-catalyst separator in the reaction zone.

The pressure employed in our process is dependent upon the character of the reaction involved. In the cracking of heavy hydrocarbon oils to gasoline, low pressures are generally employed varying from atmospheric pressure to about 50 pounds per square inch gage and usually about 5 to 20 pounds per square inch. In the reforming of low knock rating naphthas to produce high knock rating gasoline, pressures of the order of 50 to 500 pounds per square inch may be used. Where superatmospheric pressure is employed in the conversion zone, it is necessary to supply regeneration gas to the system at the same pressure inasmuch as the pressure in the regeneration zone and the reaction zone is substantially the same.

In the reforming of low knock rating naphthas, higher temperatures are generally employed than in cracking operations. Thus, we may reform at temperatures of 925 to 1100° F. and generally at 1000 to 1050° F. The catalysts employed in reforming are usually metal oxides selected from groups III, IV, V and VI of the periodic system. Aluminum oxide, vanadium oxide, chromium oxide and molybdenum oxide are particularly suitable catalysts for reforming and aromatization of naphtha and may be used alone or in combination with one another. Catalysts containing about 5 to 25% of group VI metal oxides deposited on active alumina are quite effective, and specifically a catalyst comprising about 8% of molybdenum oxide in admixture with alumina gel may be mentioned. When these catalysts are employed in the presence of about 1 to 5 volumes of hydrogen per volume of naphtha vapor treated, the paraffinic hydrocarbons contained in said naphtha may be converted to a substantial degree into aromatic hydrocarbons by a dehydrogenation reaction. The knock rating of the naphtha may be increased from a value of 35 to 55 A. S. T. M. to 70 to 90 A. S. T. M. by the reforming reaction.

Because of the effect of sedimentation or hindered settling, the rate of catalyst flow in the upward direction with the hydrocarbon vapors is retarded, thereby providing a longer average time of contact between a given catalyst particle and the vapor than the time during which the vapor is in the reaction zone. The time of contact between the vapor and the catalyst is dependent directly on the feed rate and the design of the reaction chamber. In general, contact times of the order of 5 seconds to 2 minutes are satisfactory in hydrocarbon conversion reactions.

The circulation of catalyst in the system is effected largely by the differences in catalyst density between the reaction zone and the regeneration zone, the column of catalyst in one zone being supported and substantially balanced by the column of catalyst in the other zone. By maintaining a lower vapor velocity in the regeneration zone, a higher catalyst density may be obtained which results in the rapid downflow of catalyst through the regeneration zone and upflow through the reaction zone. Circulation of catalyst may also be increased by injecting the hydrocarbon vapors at high velocity through orifices and by introducing steam into the reaction zone through jets pointed in the direction of catalyst flow. Mechanical impellers may also be employed but are not usually required. It is important to maintain the catalyst circuit free from obstructions in order to effect the desired high rate of circulation of catalyst under the relatively low pressure differentials available. However, we may purposely design the system for very high catalyst circulation rates and then control catalyst circulation by deliberately restricting the flow to a desired degree.

Although we have described the operation of our process with concurrent flow of catalyst and hydrocarbon vapors through the reaction zone the process may also be operated with advantage employing countercurrent flow in the reaction zone. One of the advantages of this operation lies in the increased time of contact between the catalyst and the hydrocarbons resulting from the greater density of catalyst in the reaction zone. However, when operating in this manner we lose the effect of the spent regeneration gases stripping hydrocarbon vapors from the catalyst before entering the regeneration zone and somewhat greater losses of product must be sustained by the carryover of hydrocarbon vapors from the reaction zone to the regeneration zone, although this may be minimized by increasing the amount of stripping at the bottom of the reaction zone by the introduction of steam or other inert gas.

Although we have described our invention as it may be applied to certain specific operations and apparatus, we intend that it be construed broadly in accordance with the scope of the following claims. Thus we may employ various forms of converter designs other than those shown. For example, we may employ a cylindrical tower divided by a baffle plate extending lengthwise of the tower to points sufficiently removed from the ends to give a free, unobstructed path for catalyst flow around the baffle. Two or more such baffles may be used to provide a plurality of reaction zones and/or regeneration zones side by side in a single converter. Other converter designs for carrying out the invention will occur to those skilled in the art.

The reaction conditions set forth are not intended to be limiting and specific conditions have not been emphasized. As an illustration of such specific conditions, we may produce from Mid-Continent gas oil a gasoline yield of 45% in a single pass operating at 925° F. using a catalyst to feed ratio of 24. The catalyst residence time within the reactor is about 0.1 minute charging 25 parts of oil per hour per part of catalyst present in suspension in the reactor by weight. These data apply to a case where fresh catalyst is used. Where the catalyst is partially spent, the rate of oil charged will be of the order of 10 to 20 parts per hour per unit weight of catalyst in the reactor.

We claim:

1. A converter for hydrocarbon oils wherein the vapors of said oils are contacted with a suspended solid conversion catalyst circulating between a reaction zone and a regeneration zone, comprising a cylindrical tower, a cylindrical baffle within said tower open at both ends providing a central enclosed vertically elongated regeneration chamber, and an annular vertically elongated reaction chamber thereabout and contiguous thereto, the walls of said baffle being constructed to seal said reaction chamber from said regeneration chamber in the intermediate region between the ends thereof, means for maintaining a suspension of finely divided solid catalyst within said reaction and regeneration chambers, an inlet for hydrocarbon oil near the bottom of said reaction chamber, an inlet for air near the bottom of said regeneration chamber and above the lower end of said baffle, an inlet for stripping steam between said air inlet and the bottom of said converter, means for maintaining a higher average catalyst density in one of said chambers, thereby effecting the circulation of catalyst between said reaction chamber and said regeneration chamber, a catalyst separating space above said cylindrical baffle in open communication with said reaction and regeneration chambers, and an outlet for reaction products and spent regeneration gas from said separating space.

2. A converter for hydrocarbon oils wherein the vapors of said oils are contacted with a dense, fluid suspension of a finely divided solid conversion catalyst circulating between a reaction zone and a regeneration zone, comprising a cylindrical tower, a cylindrical baffle within said tower open at both ends providing a central enclosed reaction chamber with substantially unrestricted open passages at the top and bottom leading to said regeneration chamber formed by the annular space surrounding said baffle, the walls of said baffle being constructed to seal said reaction chamber from said regeneration chamber in the intermediate region between the ends thereof, an inlet for introducing hydrocarbon oil into said reaction chamber near the bottom thereof, an inlet for introducing air into said regeneration chamber near the bottom thereof and above the lower end of said baffle, an inlet for introducing stripping gas into said converter between said air inlet and the bottom thereof, means for controlling the upward velocity of gases and vapors in said regeneration and reaction zones thereby effecting the circulation of catalyst in suspension through said reaction chamber and said regeneration chamber in series, catalyst separating space above said cylindrical baffle in open communication with said reaction and regeneration chambers, and an outlet for reaction products and spent regeneration gas from said separating space.

3. A converter for hydrocarbon oils wherein the vapors of said oils are contacted with a suspended solid conversion catalyst circulating between a reaction zone and a regeneration zone, comprising a cylindrical tower, a cylindrical baffle within said tower open at both ends providing a central enclosed regeneration chamber, the annular space surrounding said baffle forming the reaction chamber, means for maintaining a suspension of finely divided solid catalyst within said reaction and regeneration chambers, an inlet for hydrocarbon oil near the bottom of said reaction chamber, an inlet for air near the bottom of said regeneration chamber and above the lower end of said baffle, an inlet for stripping steam between said air inlet and the bottom of said converter, means for effecting circulation of catalyst between said reaction chamber and said regeneration chamber, a catalyst separating space above said cylindrical baffle in open communication with said reaction and regeneration chambers, an outlet for reaction products and spent regeneration gas from said separating space, a hood within said regeneration chamber in the upper part thereof extending across a substantial portion but not all of the cross-sectional area enclosed within said baffle, and a conduit in communication with said hood for withdrawing regeneration gases from the upper part of the said regeneration chamber.

4. The process of converting hydrocarbons which comprises contacting them at conversion temperature with a fluidized solid hydrocarbon conversion catalyst in a vertically elongated reaction zone, passing the vapors of said hydrocarbon upwardly through said reaction zone concurrently with suspended catalyst at a rate sufficient to maintain said catalyst in suspension and allow hindered settling thereof, separating reaction products from catalyst at the top of said reaction zone and withdrawing them from the system, regenerating said catalyst in a parallel contiguous vertically elongated regeneration zone, communicating at both ends with said reaction zone through substantially unrestricted passages, introducing oxygen-containing regeneration gas at a low point in said regeneration zone, passing said regeneration gas upwardly through said regeneration zone countercurrent to the flow of catalyst therein at a velocity sufficient to maintain said catalyst in dense free-flowing suspension while permitting said catalyst to flow downwardly therethrough, withdrawing a part of the spent regeneration gas from catalyst at an intermediate point in the upper part of said regeneration zone passing remaining spent regeneration gas countercurrent to the stream of catalyst in the top of said regeneration zone, discharging said remaining regeneration gas from the system in admixture with said reaction products, and recycling hot regenerated catalyst in suspension from the bottom of said regeneration zone to the bottom of said reaction zone at a rate sufficient to supply a substantial part of the heat required for said conversion reaction.

5. In the process of conducting chemical reactions in vapors and gases by contacting said vapors and gases in an upflowing stream in a vertically elongated reaction zone with a free-flowing dense suspension of a finely divided solid catalyst wherein a by-product deactivating material deposits on said catalyst and said deactivating material is removed in a separate vertically elongated regeneration zone in which said catalyst is maintained in a dense suspension in an upflowing stream of regeneration gas reactive with said deactivating material and the regenerated catalyst is thereafter returned to said reaction zone, the improvement comprising operating said regeneration zone contiguous to and parallel with said reaction zone, recycling catalyst in free-flowing suspension between said zones through substantially unobstructed passages therebetween at both top and bottom ends thereof, said zones being separated by a substantially impervious wall throughout the area between said passages, said passages being sufficiently large to provide substantially the same pressure in both zones during high rates of catalyst circulation the column of catalyst in one zone being supported by the pressure at the base of the catalyst column in the other zone, and producing a high rate of catalyst circulation through said zones in series by maintaining a higher average catalyst density in one zone than that in the other zone.

6. The process of converting hydrocarbons which comprises contacting the vapors at conversion temperatures with a dense fluid suspension of a finely divided solid hydrocarbon conversion catalyst in a vertically elongated reaction zone, passing said hydrocarbon vapors upwardly through said reaction zone at sufficient velocity to maintain the catalyst in dense fluid suspension therein, separating reaction products and catalyst at the top of said reaction zone, regenerating said catalyst by passing it in dense fluid suspension downwardly through an adjacent, vertically elongated regeneration zone parallel to said reaction zone merged therewith at top and bottom, introducing an oxidizing regeneration gas in said regeneration zone at a low point therein, passing said gas upwardly through said regeneration zone in contact with catalyst at sufficient velocity to maintain the catalyst in dense fluid suspension therein but less than the velocity of the vapors in said parallel reaction zone, thereby oxidizing and removing carbonaceous deposits from said catalyst, recycling regenerated catalyst in dense suspension to said reaction zone at the bottom thereof at the rate of at least five parts of catalyst by weight to one part of hydrocarbon treated in said reaction zone, said recycling being effected by the higher density of catalyst in the regeneration zone resulting from the lower vapor velocity employed therein, combining spent regeneration gases and reaction products at the top of said regeneration zone where it merges with said reaction zone and withdrawing the mixture of reaction products and regeneration products from the system.

7. The process of converting hydrocarbon oils which comprises introducing a hydrocarbon oil into the base of a vertically elongated reaction zone filled with a dense free-flowing suspension of a finely divided solid conversion catalyst having a density of about 5 to 50 pounds per cubic foot maintained at conversion temperature, conducting the vapors of said hydrocarbons upwardly through said reaction zone at sufficient velocity to maintain said catalyst in suspension while permitting hindered settling, separating catalyst from conversion products in a separating zone above said reaction zone, pressing separated catalyst into the top of an adjacent vertically elongated regeneration zone parallel to said reaction zone, said reaction and regeneration zones being merged at top and bottom, removing carbonaceous deposits from said catalyst in said regeneration zone by interaction in dense fluid suspension with an upflowing stream of an oxygen-containing gas, and recycling dense free-flowing regenerated catalyst suspension to said reaction zone through a substantially unobstructed passage connecting the bottom of said zones, maintaining said regeneration zone and said reaction zone at the same pressure, effecting circulation of catalyst between the reaction and the regeneration zones by maintaining the average density of the catalyst suspension in the regeneration zone greater than in the reaction zone, withdrawing from said separating zone a mixture of reaction products and spent regeneration gases, cooling said product mixture and separating therefrom a hydrocarbon oil heavier than the desired gasoline, further cooling and condensing liquid hydrocarbons from said products to produce a gasoline condensate, absorbing hydrocarbons from the remaining gases to produce a low heating value fuel gas and an absorbed gasoline fraction, and combining said absorbed gasoline fraction with gasoline from said gasoline condensate.

8. The process of claim 7 wherein the oil heavier than gasoline first condensed from said reaction products and regeneration gas mixture is recycled to the reaction zone of said conversion operation.

9. A converter for hydrocarbon oils wherein the vapors of said oils are contacted with a suspended solid conversion catalyst circulating between a reaction zone and a regeneration zone, comprising a cylindrical tower, a cylindrical baffle within said tower open at both ends providing a central enclosed reaction chamber with substantially unrestricted passages at the top and bottom leading to said regeneration chamber formed by the annular space surrounding said baffle, the walls of said baffle being constructed to seal said reaction chamber from said regeneration chamber in the intermediate region between the ends thereof, an inlet for introducing hydrocarbon oil into said reaction chamber near the bottom thereof, an inlet for introducing air into said regeneration chamber near the bottom thereof and above the lower end of said baffle, an inlet for introducing stripping steam into said converter between said air inlet and the bottom thereof, means for controlling the upward velocity of gases and vapors in said regeneration and reaction zones thereby effecting the circulation of catalyst in suspension through said reaction chamber and said regeneration chamber in series, catalyst separating space above said cylindrical baffle in open communication with said reaction and regeneration chambers, a cyclone separator within said separating space, an outlet for vapors from said cyclone separator, and a conduit from said cyclone separator for returning said separated catalyst to one of said zones.

10. The process of producing high knock rating gasoline and a fuel gas from hydrocarbon oils by conversion of said oils at conversion temperatures with a suspended, finely divided, solid conversion catalyst comprising introducing said oil into the lower part of a vertically elongated reaction zone within a converter, concurrently contacting the vapors of said oil at conversion temperature with a dense fluid suspension of finely divided solid conversion catalyst while flowing upwardly through said reaction zone, separating reaction products from the catalyst in a separating zone within said converter and above said reaction zone, passing separated catalyst in suspension downwardly through a vertically elonagted regeneration zone within said converter contiguous to said reaction zone and parallel therewith, said reaction and regeneration zones being merged at the top and at the bottom thereof, regenerating said catalyst by reacting at a higher temperature than said conversion temperature with an upwardly flowing stream of an oxidizing regeneration gas in said regeneration zone, the velocity of said regeneration gas being sufficient to maintain said catalyst in dense fluid suspension, returning regenerated catalyst from the bottom of said regeneration zone to the bottom of said reaction zone, discharging a mixture of reaction products and regeneration gas from said separating zone and controlling the rate of circulating catalyst through said reaction zone by maintaining a higher average density of catalyst in said regeneration zone whereby at least 10 parts of catalyst per part of oil are contacted in said reaction zone and heat is supplied to the said reaction zone by the sensible heat of the recycled regenerated catalyst.

11. The process of claim 10 wherein the rate of circulation of catalyst through said regeneration zone is maintained sufficient to prevent the temperature therein rising more than 100° F. above the temperature within said reaction zone.

12. The process of producig high knock rating gasoline and a fuel gas from incompletely vaporizable residual hydrocarbon oils by conversion of said oil at conversion temperature with a suspended, finely divided, solid conversion catalyst comprising introducing said oil as a liquid directly into the lower part of a vertically elongated reaction zone within a converter, concurrently contacting vapors of said oil at conversion temperature with a dense fluid suspension of finely divided solid conversion catalyst while flowing upwardly through said reaction zone, separating reaction products from the catalyst in a separating zone within said converter and above said reaction zone, passing separated catalyst in suspension downwardly through a vertically elongated regeneration zone within said converter contiguous to said reaction zone and parallel therewith, maintaining said reaction and regeneration zones in unrestricted communication by open passages at the top and at the bottom thereof, regenerating said catalyst by reacting at a higher temperature than said conversion temperature with an upwardly flowing stream of an oxidizing regeneration gas in said regeneration zone, the velocity of said regeneration gas being sufficient to maintain said catalyst in dense fluid suspension, discharging a mixture of reaction products and regeneration gas from said separating zone and controlling the rate of circulating catalyst through said reaction zone by maintaining a higher average density of catalyst in said regeneration zone whereby at least ten parts of catalyst per part of oil are contacted in said reaction zone and heat for vaporizing and cracking the charge is supplied to the said reaction zone by the sensible heat of the recycled regenerated catalyst.

13. An apparatus for converting hydrocarbon oils by contacting the vapors thereof with a suspended solid catalyst comprising a vertically elongated reaction chamber within said converter and a vertically elongated regeneration chamber within said converter contiguous to said reaction chamber and parallel therewith, an imperforate wall between said chambers, an open, unrestricted passage communicating between said reaction chamber and said regeneration chamber at the top thereof, and a similar passage between said chambers at the bottom thereof, said passages being sufficiently large in relation to said chambers to provide substantially no pressure differential between said chambers when catalyst suspension is flowing therethrough at a high rate, means for introducing hydrocarbon oil into said reaction chamber in the bottom thereof, means for introducing oxygenous regeneration gas into said regeneration chamber near the bottom thereof, a striping zone at the bottom of said regeneration chamber above the said bottom passage to said reaction chamber and below the point of introduction of regeneration gas, means for introducing inert stripping gas into the base of said striping zone, a catalyst separator in communication with the top of both of said reaction and regeneration chambers, and means for withdrawing substantially catalyst-free reaction products and regeneration products from said separating chamber, thereby providing for the upward movement of regeneration gases and reaction products through said regeneration chamber and reaction chamber, respectively, at sufficient velocity to maintain the catalyst in dense fluid suspension therein.

14. The process of contacting solids of small particle size with at least two separate gaseous streams in at least two separate contacting zones thru which said solids are circulated, comprising effecting said contacting operations in vertically elongated contacting zones parallel with and adjacent to each other, said contacting zones being merged at their lower ends in a lower zone of merger and at their upper ends in an upper zone of merger, passing a first gaseous stream upwardly thru a first one of said vertically elongated contacting zones at a velocity sufficient to maintain said solids in dense, turbulent suspension throughout said zone, conducting said first gaseous stream upwardly from said contacting zone thru said upper zone of merger and thence thru a separating zone wherein said solids are removed from said gases and returned to the system, transferring solids in dense fluid suspension from said first contacting zone to a second of said contacting zones thru said upper zone of merger substantially without change in pressure, passing a second gaseous stream upardly thru said second verticaly elongated contacting zone at a velocity sufficient to maintain the dense turbulent suspension of solids therein, the density of which is greater than that of the suspension of solids in said first contacting zone, conducting said second gaseous stream into said upper zone of merger wherein it is mixed with the said first gaseous stream, transferring solids in dense fluid suspension in the bottom of said second contacting zone to a low point in said first contacting zone thru said lower zone of merger substantially without change in pressure and maintaining the cyclic flow of solids upward thru said first contacting zone and downward thru said second contacting zone by the lifting effect in said first contacting zone resulting from the difference in density of the suspension of solids in both said contacting zones, said difference in density being maintained by controlling the rate of introduction of gases to said respective contacting zones.

15. The method of claim 14 which includes the further step of removing a portion of said second gaseous stream from the upper part of said second contacting zone at a level below the said upper zone of merger of said contacting zones and maintaining the upper level of said dense suspension of solids in said second contacting zone above the point of removing said gaseous stream therefrom.

VANDERVEER VOORHEES.
WILLIAM L. WEBB.